United States Patent Office 3,427,244
Patented Feb. 11, 1969

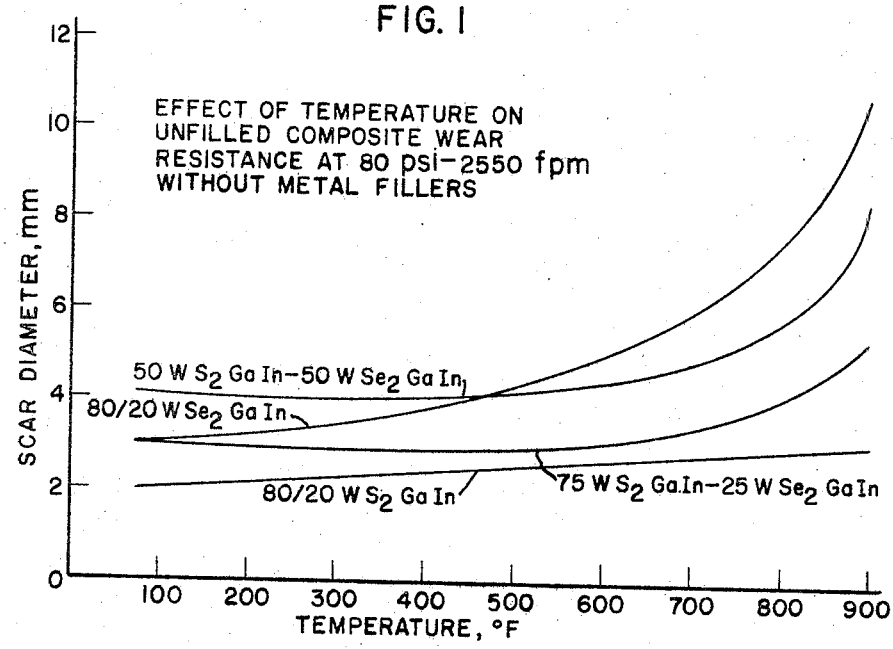
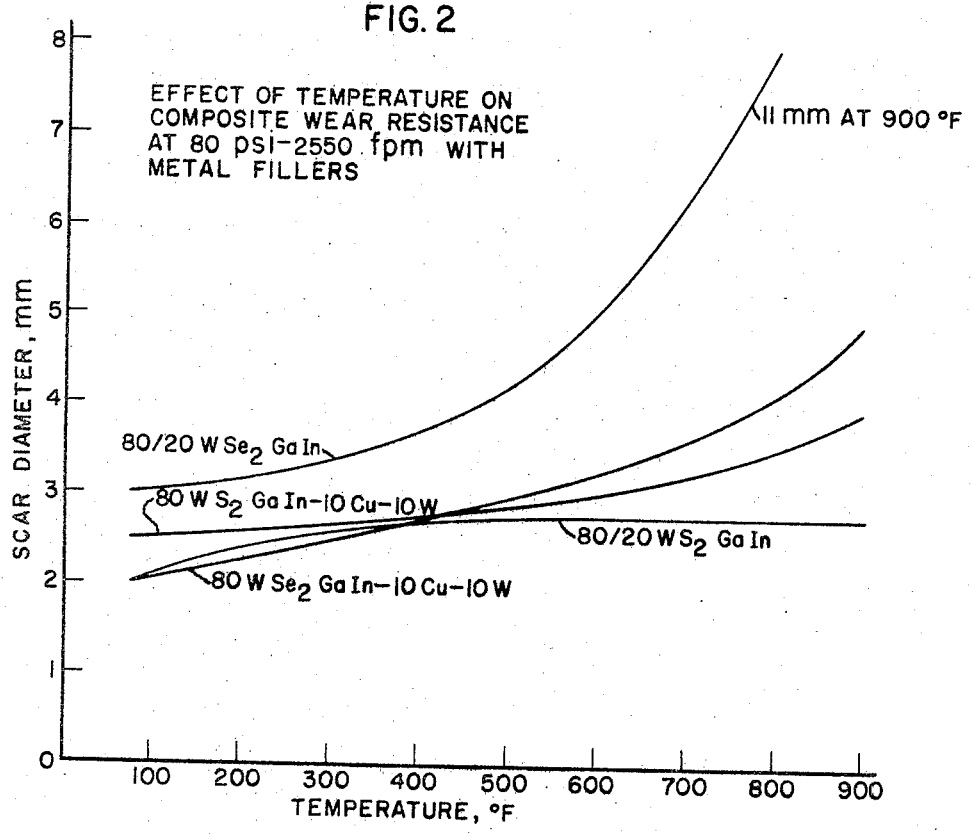

3,427,244
SOLID LUBRICANT COMPOSITES
David J. Boes, Monroeville, Pa., assignor to Westinghouse Electric Corporation, Pittsburgh, Pa., a corporation of Pennsylvania
Filed June 6, 1967, Ser. No. 643,899
U.S. Cl. 252—12        10 Claims
Int. Cl. C10m 7/00, 5/00

ABSTRACT OF THE DISCLOSURE

A self-lubricating body having a combination of mechanical strength and wear-resistance at temperatures ranging from —40° F. to 1500° F. and comprising a heat treated reaction product (a) from about 10% to 30% by weight of a low melting metal selected from a group consisting of gallium and gallium-base alloys with one or more of the metals indium, tin, cadmium, and bismuth, from 90% to 10% by weight of a solid lubricant selected from at least one of the group consisting of sulfides and selenides of tungsten and molybdenum, and (b) a filler of powered copper, molybdenum, tantalum, or silver or tungsten, with blended powders of copper and tungsten giving highest physical properties.

Cross-references to related applications

This invention is related to an improvement over copending application Ser. No. 534,822.

BACKGROUND OF THE INVENTION

Field of the invention

This invention pertains to solid lubricants. More particularly it relates to self-lubricating bodies having greatly improved mechanical strength and wear-resistance at high temperature.

Description of the prior art and background problems

There is a need for reliable lubricants that are useful at very high temperature levels in vacuum or in various atmospheres. At temperatures above about 450° F. most conventional lubricants are unsatisfactory because high temperature environments cause their evaporation, chemical decomposition, and/or oxidation. Thus, hydrocarbon oils crack, evaporate or carbonize at this temperature and higher. Such solid lubricants as graphite, molybdenum disulfide, and tungsten diselenide are useful up to about 650° F. because of their oxidation stability as compared with conventional high temperature liquid lubricants such as silicones, and polyphenyl ethers. Likewise, graphite and graphite based composites have relatively good oxidation resistance at moderate temperatures but above 750° F. the rate of oxidation of graphite and composites thereof in air increases rapidly.

In recent years many attempts have been made to develop a self-contained, solid lubricated load bearing system, such as a lubricated ball bearing system, capable of sustained operation at high temperatures under high speed, high load conditions. One objective of such work has been the development of a self-lubricated ball bearing for operation in the temperature range from about —40° F. to 1500° F. at speeds of 10,000 to 30,000 r.p.m. In addition such a bearing should be capable of operation both in vacuum and under high load.

One technique used to apply a lubricant to a ball bearing is to fabricate the ball retainer or separator from a material composed of self-lubricating compounds. As the ball bearing contacts the retainer a lubricant film is transferred from the retainer to the balls, and subsequently from the balls to the grooves of the races. Thus, the usual metal-to-metal contact resulting in bearing wear is avoided.

Various requirements for such a solid lubricant material includes first a composite which retains its lubricating ability and wear resistance in the environment in which the bearing is operating. Second, the composite must be resistant to oxidation over the temperature range required of the bearing. Finally, the composite must have sufficient mechanical strength to withstand the high stresses to which it is subjected during high speed, high load operation. Heretofore, no material has existed which satisfied those requirements.

In accordance with this invention it has been found that the foregoing problems may be overcome by providing an improved reliable solid lubricant which operates at temperatures ranging from about —40° F. to 1500° F. both in oxidizing and vacuum atmospheres. The solid lubricant composition of this invention includes a heat reacted product of (1) gallium or a gallium-alloy such as gallium-indium, (2) powdered disulfide or diselenide solid lubricants such as tungsten diselenide, molybdenum diselenide, or tungsten disulfide, and (3) a filler of equally blended powders of copper and tungsten.

Accordingly, it is an object of this invention to provide a solid lubricant composition and process which is usable at operating temperatures ranging from —40° F. to 1500° F.

It is another object of this invention to provide a solid lubricant composition which retains its lubricating ability and wear-resistance in the desired operating environment, which is oxidation resistant over a temperature range required therein, and which has sufficient mechanical strength to withstand the high stresses to which it is subjected during high speed, high load operation.

Finally it is an object of this invention to provide a solid lubricant composition which accomplishes the foregoing objects and desiderata in a simple and effective manner.

Summary of the invention

The self-lubricating composite of the present invention comprises a consolidated and heat treated intimate admixture of at least 70% by weight of (a) heat treated reaction product of from about 10% to 30% by weight of a low melting metal selected from a group consisting of gallium and alloys of gallium with one or more of indium, tin, bismuth, and cadmium, and about 90% to 70% by weight of a solid lubricant selected from at least one of the group consisting of sulfides and selenides of tungsten, molybdenum, niobium, and tantalum; and up to 30% by weight of (b) a filler composed of a blend of copper and tungsten powders, while powdered molybdenum, tantalum, and silver may be present in small amounts of up to 70%; the admixture of (a) and (b) being consolidated under pressure, at temperatures up to 250% C., into a solid body and heat treated according to progressively increasing temperature cycles up to 500 to 600° C.

Brief description of the drawings

For a better understanding of the nature and objects of this invention, reference is made to the drawings, in which:

FIGURE 1 is a graph showing the scar diameter of the solid lubricant compositions without metal fillers at varying temperatures; and FIGURE 2 is a chart showing the scar diameter of the improved solid lubricant composition with metal fillers at varying temperatures.

Description of the preferred embodiments

The self-lubricating composition of the present invention is composed of an intimate admixture of 100 parts of (a) the reaction product of (1) a solid lubricant, and (2) at least one gallium or gallium-base alloy, and (b) from 5 to 40 parts of a filler comprising certain metal powders.

The preferred range of metal powder to the reaction product is from 10 to 30 parts of the metal powder per 100 parts of the reaction product of solid lubricant and the gallium or gallium-base alloy. Outstanding optimum properties have been obtained with about 25 parts of the metal power for 100 parts of the reaction product: the composite comprising about 20% by weight of the metal powder and 80% of the reaction product.

The solid lubricant is a finely divided powder selected from at least one of a group consisting of disulfides and diselenides of tungsten and molybdenum. These compounds are tungsten diselenide, tungsten disulfide, molybdenum diselenide, and molybdenum disulfide, and may be used individually or in admixture of any two, three or all four. The solid lubricant is preferably in powder form and having an average particle size ranging from 60 to −325 mesh (i.e., all passes through a 325 mesh sieve). The solid lubricant compound may be present in amounts varying from about 70 to 90% by weight, and preferably 75 to 85 weight percent with an optimum of about 80 weight percent of the total thereof with gallium, or gallium indium or gallium, tin, or admixtures of two or all three.

The metal gallium is preferably reacted with the solid lubricant compounds such as the disulfides and diselenides of tungsten and molybdenum. However, some alloys of gallium may also be used and are preferably selected from at least one of the group consisting of gallium-indium, gallium-tin, and gallium-indium-tin, or mixtures thereof, the alloys containing at least 50% of gallium. Small amounts of other metals soluble in gallium and having a low vapor pressure at temperatures of use of the composites, such as silver, may be present in the gallium alloy. The amount of gallium and/or gallium base alloy may vary from about 10 to 30 weight percent of the total with the solid lubricant and is preferably added in the molten or liquid condition to the solid lubricant and reacted therewith by heating before the filler is added. For this purpose the gallium-indium alloy is more convenient because it is molten at room temperature. The gallium-indium alloy is composed of about 75 weight percent gallium and 25 weight percent indium. The preferred amount of gallium and/or gallium base alloy is about 20% of the total reaction product. Where less than about 10 weight percent of gallium and/or gallium base alloy is used the resulting self-lubricating composite does not exhibit as high an oxidation resistance at elevated temperatures. On the other hand where more than about 30% gallium and/or gallium base alloy is used it tends to become more corrosive at the higher temperatures of use.

The filler is a finely divided powder (preferably in the range of −200 to +325 mesh) which is preferably selected from at least one of a group consisting of copper, and binary mixture as copper and tungsten, copper and tantalum, copper and molybdenum, and copper and silver. The amount of copper with one of the other metals may vary from one-third to two-thirds copper and two-thirds to one-third of the other metal. The preferred other metal to admix with powdered copper is tungsten and the preferred combination of copper and tungsten is about 50% by weight of each. Although copper alone enhances the strength of the composite pure copper gives less strength than is obtained when copper is admixed with tungsten. The copper and tungsten powders can be admixed, or a copper-tungsten alloy is powdered or mixtures of the alloy with either element of copper and tungsten or both can be used.

As an ingredient of the total composite the filler composition preferably ranges from about 5 to 30% and preferably from 10 to 20% weight percent with the optimum of about 20% with the copper-tungsten mixture. The more filler is employed, the greater the strength of the composite, however the poorer the lubricity.

The ingredients of the solid lubricant composite are blended by first combining the solid lubricant powders with the gallium and/or gallium base alloy. This is preferably accomplished by placing the ingredients in a ball mill for a sufficient time until the liquid gallium and/or gallium base alloy is completely absorbed by the greater amount of the solid lubricant. A free flowing powder is thereby formed.

The powdered metal filler is then added to the free flowing powder of solid lubricant and gallium alloy, which are then mixed together until a homogeneous blend is obtained. The foregoing procedure whereby the filler is added after the solid lubricant and gallium have been mixed to form a powder is preferred. If, in the alternative, the powdered metal filler and solid lubricant are first mixed and the liquid gallium is added the filler powder particles are preferentially wetted by the gallium so that less gallium is absorbed by the lubricant powder whereby a weaker and more readily oxidizable product is obtained. This latter expedient is less efficient and results in somewhat poorer composites.

The resulting mix is then consolidated. One method of consolidation comprises placing the mix into a tool steel die of the desired shape where it is compressed at a temperature ranging from about room temperature to 250° C. The compression pressure ranges from 25,000 to 100,000 p.s.i.; the preferred pressure being 50,000 p.s.i. and the preferred temperature being room temperature.

The compacted solid body or pellet produced by the compression procedure is then subjected to a regulated, progressively increasing, high temperature cure or heat treatment involving a three-phase cycle. In the first phase, the body is heated for at least 1 to 24 hours at temperatures ranging from 175 to 275° C., a preferred time and temperature being 15 hours at 220° C. In the second phase the body is heated for 1 to 24 hours at a temperature ranging from 300 to 375° C., the preferred time being about 8 hours at 350° C. In the third phase of the cure, the body is heated for 1 to 24 hours at a temperature ranging from 500 to 600° C., the preferred time being 8 hours at 550° C.

During the curing or reaction cycle the components ($WSe_2$, Ga, and In for instance) undergo exothermic chemical reactions to form complexes of the components, the complete analysis of which is not presently known. The first phase of the reaction cycle in the temperature range of 175–275° C. initiates the reaction. In the second phase of the cycle in the temperature range of 300–375° C. the reaction is completed and the pellet now possesses excellent oxidation resistance. In the third phase of the cycle at 500 to 600° C. the pellet achieves physical stability and is stabilized dimensionally.

The heat treating of the composition body may be carried out in a relatively continuous manner; that is, the compacted body is placed in a furnace with air or a neutral or non-oxidizing atmosphere such as argon, and heated at a slow progressively increasing temperature throughout each of the aforementioned stages. Thus, after heating rapidly to 175° C. the compacted body is heated to increase its temperature at 10° F. per hour for 24 hours, and then slowly cooled. It is also feasible to interrupt the curing between the phases of the cycle, as for example, to react the components initially at from 175° C. to 300° C., and cooling to room temperature before reheating to the next higher temperature range for the second phase, and then cooling and finally heating to the highest temperature.

During the curing cycle three reactions occur between the gallium or liquid gallium alloy and the solid lubricant component. During the first phase an intermetallic compound is formed at about 200° C. which results in the attainment of the major mechanical strength of the body. Finally, during the third portion of the cycle at 475° C. additional intermetallic compounds are formed. The intermetallic compounds are oxidatively stable over a temperature ranging from −40° to 1500° F. and have been tested at cryogenic temperatures of −180° F. Moreover, unlike graphite containing self-lubricating members the products of the above-described curing cycle are not dependent upon the presence of moisture for their lubricating properties. Accordingly they may be used in vacuum or unusually low dew-point atmospheres or environments.

After the fabrication and curing stages have been completed the body may be machined to the desired shape such as a retainer for ball bearings, a sleeve for journal bearings, or a gear.

In order to test the lubricity of various composites at increasing temperatures tests were made with materials lacking metal fillers as well as with materials having metal fillers as shown in FIGS. 1 and 2 of the drawing. A bearing system was tested having a 200 hour average life while operating in air at 10,600 r.p.m.'s, 600° F. and a load of 50 pounds thrust and 50 pounds radial. To achieve this life a retainer fabricated from an 80% $WSe_2$–20% GaIn (wt.) composite having a compressive strength of 20,000 p.s.i. was used. Atttempts to utilize the same bearing system under identical operating conditions at 900° F. however resulted in a reduction in life to 35 hours. This reduction in life was caused by substantially higher wear rates of the retainer material at 900° F. than those experienced at 600° F. A study of $WSe_2$-GaIn wear characteristics revealed that under high speed conditions the material suffers a sharp increase in wear when exposed to the 900° F. environment (FIG. 1, 80/20 $WSe_2$/GaIn additional work revealed that substitution of $WS_2$ for $WSe_2$ in the lubricating-gallium aggregrate indium provided a composite with excellent wear-resistance at temperatures up to at least 900° F. As shown in Table I however, a basic problem associated with the $WS_2$-GaIn composite was the lack of mechanical strength. Attempts to operate bearings at 900° F. utilize this composite as the retainer material resulted in bearing failure due to retainer fracture.

TABLE I.—MECHANICAL PROPERTIES OF SOLID LUBRICANT-GALLIUM-INDIUM COMPOSITES

| Material Composition, Wt. Percent | Fabricating Pressure, p.s.i. | Compressive Strength, p.s.i. |
|---|---|---|
| 80 $WS_2$ (1,400° F.)–20 GaIn [1] | 30,000 | 6,300 |
| | 40,000 | 8,800 |
| | 50,000 | 4,000 |
| | 75,000 | 4,000 |
| | 100,000 | 7,350 |
| 80 $WS_2$ (750° F.)–20 GaIn [1] | 50,000 | 12,100 |
| | 50,000 | 13,100 |
| | 50,000 | 13,300 |
| | 50,000 | 12,300 |
| 80 $WS_2$ (750° F.)–20 GaIn [2] | 50,000 | 15,590 |
| | 50,000 | 14,300 |
| 80 $WS_2$GaIn–20 Cu | 25,000 | 13,000 |
| | 50,000 | 15,350 |
| | 75,000 | 8,150 |
| | 100,000 | 9,700 |

See footnotes at end of table.

TABLE I.—MECHANICAL PROPERTIES OF SOLID LUBRICANT-GALLIUM-INDIUM COMPOSITES—Continued

| Material Composition, Wt. Percent | Fabricating Pressure, p.s.i. | Compressive Strength, p.s.i. |
|---|---|---|
| 80 $WS_2$GaIn–20 W | 25,000 | 16,300 |
| | 50,000 | 16,250 |
| | 75,000 | 16,450 |
| | 100,000 | 15,800 |
| 80 $WS_2$GaIn–10 Cu–10 W | 25,000 | 19,300 |
| | 50,000 | 25,900 |
| | 50,000 | 23,650 |
| | 50,000 | 24,450 |
| 80 $WSe_2$GaIn–10 Cu–10 W | 25,000 | 16,400 |
| | 50,000 | 33,350 |
| | 75,000 | 43,800 |
| | 100,000 | 47,250 |

[1] 1 hr. ball-mill.
[2] 30 min. ball-mill.

An initial improvement in $WS_2$-GaIn strength was achieved by synthesizing the lubricant at temperatures of 750 to 800° F. rather than the 1400° F. level formerly used. Although the lower synthesis temperatures increated the composite compressive strength from an average of 6600 p.s.i. to 15,000 p.s.i., it remained below the 20,000 p.s.i. level shown to be satisfactory for the 600° F. test with $WSe_2$-GaIn. The addition of individual metal fillers, such as copper, tungsten, molybdenum and tantalum produced moderate increases in the strength of the composite. However, the use of a filler composed of blends of copper and tungsten powders in with the reaction products gave outstanding strength increases. Thus the $WS_2$-GaIn composite had an increase in strength from 15,000 p.s.i. to 26,000 p.s.i. by adding 20% of a blend of equal parts of copper and tungsten powders. The use of this blend of copper and tungsten powders in $WSe_2$-GaIn increased this composite's strength phenomenally from 20,000 to 47,000 p.s.i. Other properties such as wear-resistance were improved, as shown in FIG. 2, the high temperature wear-resistance of these high strength materials were within the acceptable limits and substantially better than that of the unfilled $WSe_2$-GaIn composite.

In addition all the composites with at least 5% of powdered metal possess greater wear-resistance at the lower temperatures than the basic $WSe_2$-GaIn composite used in a successful 600° F. bearing system. For that reason an improvement in the life of the bearing system is possible by utilizing the higher strength-wear resistant metal filler composites of this invention. Greater strength is desirable in the application of the composites are retainers in larger bearings, where centrifugal force associated with high speed conditions have formerly caused early retainer failure.

The effect of composite strength of metal-filler combinations other than copper-tungsten was determined in a study that included the use of fillers in concentrations of both 10% and 20% as shown in Table II.

TABLE II.—EFFECT OF METAL FILLERS ON $WS_2$-GaIn COMPOSITE STRENGTH

| Composition, Wt. Percent | Compressive Strength, p.s.i. |
|---|---|
| 90 $WS_2$GaIn [2]–5 Cu–5 Ta | 18,750 |
| 90 $WS_2$GaIn [2]–5 Cu–5 Mo | 18,850 |
| 90 $WS_2$GaIn [2]–5 Cu–5 Ag | 20,400 |
| 80 $WS_2$GaIn [2]–10 Cu–10 Ta | 20,800 |
| 80 $WS_2$GaIn [2]–10 Cu–10 Mo | 18,350 |
| 80 $WS_2$GaIn [2]–10 Cu–10 Ag | 19,250 |
| 90 $WS_2$GaIn [2]–6⅔ Cu–3⅓ W | 12,950 |
| 90 $WS_2$GaIn [2]–7½ Cu–2½ W | 24,550 |
| 90 $WS_2$GaIn [2]–3⅓ Cu–6⅔ W | 16,300 |
| 90 $WS_2$GaIn [2]–2½ Cu–7½ W | 17,350 |

[1] $WS_2$ annealed at 750° F.; ball-milled 30 minutes.
[2] 80% $WS_2$–20% GaIn (75% Ga–25% In).
Note.—All pellets at 50,000 p.s.i.—room temperature.

All specimens were fabricated at room temperature and pressures of 50,000 p.s.i. The fillers included were copper with tantalum, molybdenum, and silver. The filler blend ratio was 1 to 1 in all cases. A slight improvement in strength was achieved over the basic $WS_2$-GaIn composite in all cases involving the copper-metal filler. None of the materials however, matched the compressive strength of the copper-tungsten filled $WS_2$-GaIn composite (25,900 p.s.i.) described. However the substitution of nickel for copper in the several filler blends resulted in severe pellet cracking and delamination during the final 1,000° F. cycle of the cure. This establishes the merit of copper as the filler metal in the compositions. In view of the foregoing further studies of blended filler composites were directed to the copper tungsten combination.

Experiments investigating the use of lower concentrations of copper and copper-tungsten fillers in both $WSe_2$-GaIn and $WS_2$-GaIn composites are shown in Table III.

Pellets were fabricated at four different pressures for each composite composition. All specimens were prepared at room temperature and contained 90 wt. percent basic lubricant-gallium-indium aggregate. In the case of the copper and copper-tungsten filled $WS_2$-GaIn composites it was found that the compressive strengths could be held at the 18,000 to 20,000 p.s.i. level with the use of only 10 weight percent filler. However, no advantage was found in the use of a copper-tungsten blend rather than copper alone. When 5% less gallium-indium was used in $WS_2$-GaIn aggregate a marked decrease in strength was observed. However, when $WSe_2$ was substituted for $WS_2$ in the same series of experiments it was found that the copper-tungsten filler provided stronger composites than those using only copper particularly when the specimens were fabricated at 50,000 p.s.i. or less.

In view of the foregoing results with regard to composite strength the various formulations were tested on the Hohman friction-wear apparatus over a 900° F. temperature range.

The results of the tests are summarized in Table IV.

TABLE IV.—EFFECT OF TEMPERATURE ON FRICTION-WEAR [1] OF VARIOUS COMPOSITES—80 p.s.i.—2,550 f.p.m.

| Material Composition, wt. percent | Compressive Strength, p.s.i. | 75° F. | | 600° F. | | 900° F. | |
|---|---|---|---|---|---|---|---|
| | | $\mu$ [2] | Scar, mm. | $\mu$ | Scar, mm. | $\mu$ | Scar, mm. |
| 90 $WS_2$GaIn-10 Cu | 21,000 | 0.18 | 3 | -------- | 2¼ | 0.11 | [4] 3 |
| 80 $WS_2$GaIn-20 Cu | 12,950 | 0.17 | 3 | 0.22 | 2 | 0.34 | [4] 2¾ |
| 70 $WS_2$GaIn-30 Cu | 17,050 | 0.20 | 2½ | 0.28 | 2 | 0.45 | [4] 3 |
| 90 $WSe_2$GaIn-10 Cu | 20,800 | 0.04 | 2 | 0.15 | 3¾ | 0.13 | [4] 4 |
| 80 $WSe_2$GaIn-20 Cu | 27,050 | 0.06 | 2 | 0.15 | 3¾ | 0.42 | [5] 3¼ |
| 70 $WSe_2$GaIn-30 Cu | 29,030 | 0.13 | 2 | 0.15 | 4¼ | 0.45 | [5] 4 |
| 90 $WS_2$GaIn-5 Cu-5W | 18,700 | 0.17 | 2½ | 0.14 | 2¾ | 0.17 | [3] 2¾ |
| 90 $WSe_2$GaIn-5 Cu-5W | 28,650 | 0.10 | 2 | 0.04 | 4 | 0.20 | [4] 3¾ |

[1] Hohman test against M2 Tool Steel.
[2] $\mu$=friction coefficient.
[3] Good film.
[4] Average film.
[5] Poor film.

TABLE III.—EFFECT OF Cu AND Cu-W FILLERS ON SOLID LUBRICANT-GALLIUM-INDIUM COMPOSITES

| Composition, Wt. Percent | Fabricating Pressure, p.s.i. | Compressive Strength, p.s.i. |
|---|---|---|
| 90 $WS_2$GaIn [1]-10 Cu | 25,000 | 15,300 |
| | 50,000 | 21,000 |
| | 75,000 | 21,850 |
| | 100,000 | 19,800 |
| 90 $WSe_2$GaIn [2]-10 Cu | 25,000 | ([4]) |
| | 50,000 | 20,800 |
| | 100,000 | 15,000 |
| 90 $WS_2$GaIn [1]-5 Cu-5 W | 25,000 | 18,000 |
| | 50,000 | 18,700 |
| | 75,000 | 15,800 |
| | 100,000 | 16,150 |
| 90 $WSe_2$GaIn-5 Cu-5 W | 25,000 | 27,950 |
| | 50,000 | 28,650 |
| | 75,000 | 17,300 |
| | 100,000 | 18,700 |
| 90 $WS_2$GaIn [3]-5 Cu-5 W | 25,000 | 9,850 |
| | 50,000 | 12,350 |
| | 75,000 | 13,600 |
| | 100,000 | 15,450 |

[1] 80 $WS_2$-20 GaIn (75 Ga-25 In), weight percent.
[2] 80 $WSe_2$-20 GaIn (75 Ga-25 In), weight percent.
[3] 85 $WS_2$-15 GaIn (75 Ga-25) In), weight percent.
[4] Pellet delaminated.

All of the compositions shown in Table IV provide good to excellent wear-resistance from room temperature to 900° F. under high surface speeds. The wear results at 900° F. are misleading however unless evaluated in conjunction with the friction coefficient and the type of film deposited on the shaft surface. At 900° F. the friction coefficient increases sharply as filler content exceeds 10%. At 600° F. however, the oxidation of the film is less severe. In general poorer filming ability was exhibited by those compositions containing 20% or more filler. In all cases the $WS_2$ based compositions demonstrated slightly better wear-resistance and filming ability than their $WSe_2$ counterpart.

Functional tests were performed on the bearing system which tests were operated at 10,600 r.p.m. and, except for a room temperature life test, at a temperature of 900° F. The results of these experiments are summarized in Table V.

TABLE V.—204 FUNCTIONAL TEST RESULTS—10,600 R.P.M.

| Run No. | Load, lbs. Thrust | Load, lbs. Radial | Temp., °F. | Life, Hrs. | Ball No. | Cage Type | Cage Fit | Cage Composition, wt. percent | Failure Mode |
|---|---|---|---|---|---|---|---|---|---|
| 188 | 50 | 50 | 900 | 0.1 | 8-M2 | LL | L10 [2] | 80 Se$_2$W GaIn-10 Cu-10 W | Bearing wear—rough operation. |
| 189 | 50 | 50 | 900 | 2 | 8-M2 | LL | L10 [2] | 80 WS$_2$GaIn-10 Cu-10 W | Rough operating—stopped for inspection. |
| 190 | 25 | 25 | 900 | 6 | 8-M2 | LL | L10 [2] | 80 WS$_2$GaIn-10 Cu-10 W | Cage fracture. |
| 191 [1] | 50 | 50 | 75 | 362 | 8-M2 | LL | L10 [2] | 80 WSe$_2$GaIn-10 Cu-10 W | Do. |
| 192 | 50 | 50 | 900 | 2.3 | 8-M2 | LL | L10 [2] | 90 WS$_2$GaIn-5 Cu-5 W | One pocket bridge cracked—rough operation. |
| 193 | 75 | 50 | 900 | 3.6 | 7-M2 | Insert | L10 [2] | {80 WS$_2$-20 GaIn Ring / 90 WS$_2$GaIn-5 Cu-5 W Inserts} | Insert fracture. |
| 194 | 50 | 50 | 900 | 6 | 7-M2 | do | L10 [2] | {80 WS$_2$-20 GaIn Ring / 80 WS$_2$GaIn-10 Cu-10 W Inserts} | Do. |
| 195 | 75 | 50 | 900 | 2 | 7-M2 | do | L10 [2] | 90 WS$_2$GaIn-5 [3] Cu-5 W | Do. |
| 196 | 50 | 50 | 900 | 12 | 8-M2 | LL | L10 [2] | 90 WS$_2$GaIn-5 Cu-5 W | High wear—cage fracture. |
| 197 [a] | 50 | 50 | 900 | 0.7 | 7-M2 | LL | L10 [2] | 85 WSe$_2$GaIn-15 Ta | Pocket wear. |
| 198 [a] | 50 | 50 | 900 | 9 | 7-M2 | LL | L10 [2] | 80 WS$_2$GaIn-10 WSe$_2$GaIn-5 Cu-5 W | Cage fracture—wear. |
| 199 [a] | 50 | 50 | 900 | 0.7 | 7-M2 | LL | L10 [2] | 90 WSe$_2$GaIn-5 Cu-5 W | Pocket wear. |
| 200 [a] | 50 | 50 | 900 | 1 | 7-M2 | LL | L10 [2] | 90 WSe$_2$GaIn-10 Cu | Cage instability—pocket wear. |
| 201 [a] | 50 | 50 | 900 | 5.5 | 7-M2 | LL | L10 [2] | 90 WS$_2$GaIn-10 Cu | Pocket wear. |

[1] Bearing components other than cage previously operated for 1,100 hours, 75° F., 3,400 r.p.m., 100 lb. T/100 lb. R.
[2] L10 Fit—0.020″ clearance between ball and pocket; 0.018″ clearance between cage and inner race.
[3] 85 WS$_2$-15 GaIn.
[a] Cage width increased from 0.550″ to 0.750″.

The primary purpose of these tests was to evaluate the 900° F. performance of the bearings equipped with self-lubricating retainers employing various metal fillers. The fillers were employed in an attempt to improve both wear resistance and mechanical strength. Although the operating characteristics of the metal filled retainers were found to be inferior to those of the solid lubricant-gallium-indium composites for the tests at 900° F., satisfactory performances were observed with the metal filled retainers for the —40° to 600° F. temperature range. For example, Run No. 101 had a life of 360 hours on a metal filled retainer system at room temperature. This is a 60 hour improvement over the life obtained with a basic WSe$_2$-GaIn retainer under identical operating conditions. Moreover as shown in Table IV little if any increase in friction or wear is observed in moving from room temperature to 600° F. Only upon reaching 900° F. does the material suffer a sharp increase in friction coefficient.

One reason for the reduction in the life observed with the metal-filled composites is the fact that 900° F. is well beyond the threshold oxidation temperature of the solid lubricants currently being employed. Solid lubricant films being transferred to the bearing surfaces are therefore required to handle a far more difficult lubrication job at 900° F. than at 600° F., particularly under the operating conditions involved. The greater the reservoir of lubricant available therefor the more efficiently can the lubrication problem be handled. The basic solid lubricant-gallium alloy composite contains 20% filler (GaIn). The addition of 20% more filler reduces the material available for lubrication purposes by an additional 25%. This reduction in lubrication content to 60% is evidently too low to effectively prevent bearing wear at 900° F. and high load-high speed conditions. An example of this is found in a comparison of Runs Nos. 188 and 199. With a copper-tungsten filled retainer, the bearing components from Run No. 188 suffered the following wear rates at 900° F. after only five minutes of operation:

|  | Gms. |
|---|---|
| Inner race | 0.094 |
| Outer race | 0.143 |
| Balls—(8) | 0.275 |

On the other hand, in Run No. 191 the same retainer material satisfactorily lubricated a ball bearing operating under the same conditions for 362 hours at room temperature.

Use of a lubricant exhibiting a higher threshold oxidation temperature (WS$_2$~800° F. vs. WSe$_2$~650° F.) does alleviate this problem. In Run No. 189, the same type of bearing system operating under identical load-speed-temperature conditions but using a WS$_2$GaIn-Cu-W retainer suffered the following weight changes after 2 hours operation:

|  | Gms. |
|---|---|
| Inner race | 0.002 |
| Outer race | 0.001 |
| Balls—(8) | 0.029 |

Accordingly, the composite of the present invention has partially satisfied the problem of providing a self-lubricating body which may be used in a wide temperature range from —40 to 900° F. The invention is particularly directed to solid lubricants by satisfying the prerequisites of speed, temperature and load involved in the use of solid lubricants.

Various modifications may be made within the spirit of the invention.

What is claimed is:

1. A self-lubricating body having oxidation resistance at temperatures ranging from —40° to 1,500° F. comprising 100 parts by weight of a sintered composite product of (a) 10 to 30% by weight of a low melting metal selected from a group consisting of gallium and base alloys of gallium with at least one metal of the group of indium, tin, cadmium and bismuth, and from 90% to 70% by weight of a solid lubricant selected from at least one of the group consisting of sulfides and selenides of tungsten and molybdenum, and from 5 to 40 parts by weight of (b) a filler comprising a finely divided metal of at least one metal selected from a group consisting of copper, tungsten, tantalum, molybdenum, silver, and alloys thereof, the body having been produced by admixing and consolidating it under pressure and then heat treated at temperatures up to 1100° F.

2. The self-lubricating body of claim 1 in which the low melting metal in (a) includes small amounts of other metals soluble in gallium and having a low vapor pressure at the temperature of use of the body.

3. The self-lubricating body of claim 1 in which the solid lubricant is composed of in weight percent of from about 70% to 90% mixture of tungsten diselenide.

4. The self-lubricating body of claim 1 in which the filler (b) is composed in weight from about one to two parts of copper and from two to one parts of tungsten.

5. The self-lubricating body of claim 2 in which gallium alloy is composed in weight percent of about 75% gallium and of about 25% indium.

6. The self-lubricating body of claim 1 in which the total amount of filler (b) ranges from about 10 to 30 parts.

7. The self-lubricating body of claim 6 in which the total amount of filler (b) is about 25 parts.

8. The self-lubricating body of claim 6 in which the filler comprises substantially equal parts of copper and tungsten and constitutes about 20 weight percent of the total body.

9. The self-lubricating body of claim 1 in which about 80% of the body is composed of a mixture containing about 80% of tungsten diselenide and about 20% of gallium-indium, and of a filler composed of about 10% copper and about 10% tungsten.

10. The self-lubricating body of claim 1 in which about 80% of the body is composed of the reaction product of a mixture containing about 80% of tungsten disulfide and about 20% of gallium-indium, and of a filler composed of about 10% copper and about 10% tungsten.

References Cited

UNITED STATES PATENTS

| | | | |
|---|---|---|---|
| 2,686,155 | 8/1954 | Willis et al. | 252—12 |
| 2,700,623 | 1/1955 | Hall | 252—12 |
| 2,855,377 | 10/1958 | Stott | 252—12 |
| 2,980,475 | 4/1961 | Wolfe | 252—12 |
| 2,998,397 | 8/1961 | Riesing | 252—12 |
| 3,122,505 | 2/1964 | Rulon-Miller et al. | 252—12 |
| 3,141,238 | 7/1964 | Horman | 252—12 |
| 3,257,317 | 6/1966 | Bre et al. | 252—12 |
| 3,317,341 | 5/1967 | Buckley et al. | 252—12 |
| 3,014,865 | 12/1961 | Seniff et al. | 252—12 |

DANIEL E. WYMAN, *Primary Examiner.*

J. VAUGHN, *Assistant Examiner.*